United States Patent
Dean et al.

(10) Patent No.: US 6,645,028 B1
(45) Date of Patent: Nov. 11, 2003

(54) METHOD FOR IMPROVING UNIFORMITY OF EMISSION CURRENT OF A FIELD EMISSION DEVICE

(75) Inventors: Kenneth A. Dean, Phoenix, AZ (US); Babu R. Chalamala, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 554 days.

(21) Appl. No.: 09/589,018

(22) Filed: Jun. 7, 2000

(51) Int. Cl.$^7$ .................................................. H01J 9/44
(52) U.S. Cl. .......................................................... 445/6
(58) Field of Search ........................................ 445/24, 6

(56) References Cited

U.S. PATENT DOCUMENTS

| | | | | |
|---|---|---|---|---|
| 5,209,687 A | * | 5/1993 | Konishi .......................... | 445/6 |
| 5,588,893 A | * | 12/1996 | Kaftanov et al. ............... | 445/6 |
| 5,658,180 A | * | 8/1997 | Takagi ............................ | 445/6 |
| 5,857,882 A | | 1/1999 | Pam et al. | |
| 6,059,627 A | | 5/2000 | Dean et al. | |
| 6,149,480 A | * | 11/2000 | Iwasaki et al. ................. | 445/6 |
| 6,283,812 B1 | * | 9/2001 | Jin et al. ....................... | 445/24 |

OTHER PUBLICATIONS

Srivastava et al, Applied Physics Letters, vol. 72, No. 14, Apr. 1998 pp. 1685–1687.*

"*Flat Panel Display Prototype Using Low–Voltage Carbon Field Emitters*", by A.Y. Tcheropanov, A.G. Chakhovskoi, and V.B. Sharov, pp. 482–486, J. Vac. Sci. Technol. B 13(2), Mar./Apr. 1995, ©1995 American Vacuum Society.

"*Method of Fabrication of matrix carbon fiber field emission cathode structures for flat–panel indicators*", by A.G. Chakhovskoi, E.P. Sheshin, A.S. Kupryashkin, and V.A. Seliverstov, pp. 511–513, J. Vac. Sci. Technol. B 11(2), Mar./Apr. 1993, ©1993 American Vacuum Society.

* cited by examiner

Primary Examiner—Kenneth J. Ramsey
(74) Attorney, Agent, or Firm—William E. Koch

(57) ABSTRACT

A method for improving uniformity of emission current of a field emission display (100) includes the step of providing a first carbon nanotube (119) and a second carbon nanotube (118), which at least partially define an electron emitter (116). First carbon nantotube (119) is characterized by a first emission current capability and second carbon nanotube (118) is characterized by a second emission current capability, which is less than the first emission current capability. The method further includes the steps of causing first carbon nanotube (119) to be reduced in length at a first rate and, concurrently, causing second carbon nanotube (118) to be reduced in length at a second rate, which is less than the first rate and can be equal to zero, thereby reducing the difference between the second emission current capability and the first emission current capability and, thus, improving uniformity of emission current. The selective reductions in length are preferably achieved by performing the step of causing a burn-in current to be emitted by electron emitter (116).

20 Claims, 3 Drawing Sheets

METHOD FOR IMPROVING UNIFORMITY OF EMISSION CURRENT OF A FIELD EMISSION DEVICE

FIELD OF THE INVENTION

The present invention pertains to the area of field emission devices and, more particularly, to methods for improving the uniformity of emission current of a field emission display.

BACKGROUND OF THE INVENTION

Field emission devices having surface electron emitters are known in the art. It is further recognized in the art that surface electron emitters provide advantages over Spindt tip emitters because surface emitters can produce a greater current density than tip emitters. Surface emitters also allow for use of greater device dimensions, thereby relaxing error tolerances.

However, prior art surface emitters are commonly plagued with emission currents that are non-uniform over the emission surfaces. One prior art scheme for addressing the nonuniformity is taught by Pan et al in U.S. Pat. No. 5,857,882, entitled "Processing of Materials for Uniform Field Emission." Pan et al teach the use of an electron-emitting film, which is made from polycrystalline diamond, diamond-like carbon, graphite, or amorphous carbon. Pan et al further teach improving the emission uniformity of the film by conditioning the surface thereof. Pan et al teach that the conditioning is accomplished by scanning a metal electrode over the surface of the film. It is believed that this scheme increases the number of emission sites per unit area of the film. However, each individual emission site is capable of emitting a site current. Non-uniformity of the overall emission current can result from non-uniformity among the site currents. Pan et al do not teach a readily controllable method for improving uniformity among the site currents. Furthermore, the scheme taught by Pan et al is time consuming and may cause damage to a field emission device due to arcing.

Accordingly, there exists a need for a method for improving the uniformity of the emission current of a field emission device having surface emitters.

Figure 1:
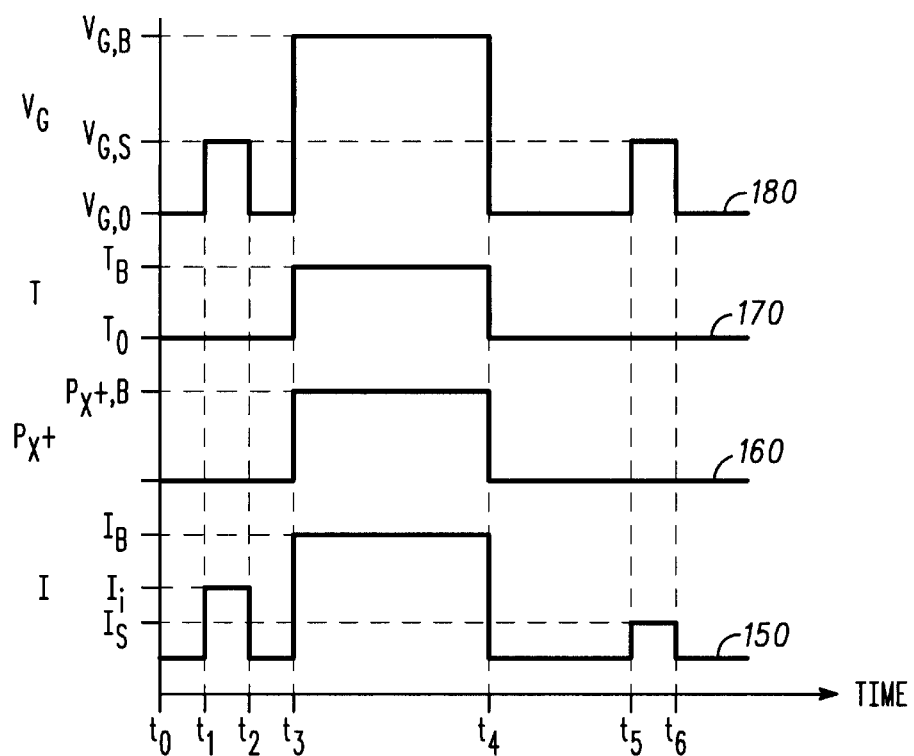
FIG. 1 is a timing diagram of a preferred example, which utilizes a burn-in current, of a method for improving the uniformity of emission current of a field emission device, in accordance with the invention.

It will be appreciated that for simplicity and clarity of illustration, elements shown in the drawings have not necessarily been drawn to scale. For example, the dimensions of some of the elements are exaggerated relative to each other. Further, where considered appropriate, reference numerals have been repeated among the drawings to indicate corresponding elements.

DESCRIPTION OF THE PREFERRED EMBODIMENTS

The invention is for a method for improving uniformity of emission current of a field emission device. The method of the invention includes the steps of providing carbon nanotubes, which preferably define a surface field emitter, and controllably and selectively reducing the lengths of the carbon nanotubes, in a manner that results in greater uniformity of emission current among the individual carbon nanotubes.

The carbon nanotubes initially include low-emission nanotubes and high-emission nanotubes. That is, the high-emission nanotubes are characterized by a capability for emitting higher emission currents than the low-emission nanotubes for a given configuration of device voltages. This non-uniformity in emission current capabilities results in non-uniformity of emission current over the surface field emitter and can result in non-uniformity of emission current among individual surface field emitters. The method of the invention includes the step of reducing the lengths of the high-emission nanotubes at rates, which are greater than the rates at which the lengths of the low-emission nanotubes are reduced.

In general, this results in a greater uniformity of the electric field strength that exists at the emissive end of each carbon nanotube and, thus, results in greater uniformity of the individual emission current from each carbon nanotube. The method of the invention is largely self-controlling because the rate at which the length of a nanotube is reduced depends upon the electric field strength at its emissive end, and, thus, depends upon the emission current capability of the nanotube.

FIG. 1 is a timing diagram of a preferred example, which utilizes a burn-in current, of a method for improving the uniformity of emission current of a field emission device, in accordance with the invention. The timing diagram of FIG. 1 is described below with reference to FIGS. 2, 3, and 4. In particular, FIG. 2 corresponds to the timing diagram between times t1 and t2; FIG. 3 corresponds to the timing diagram between times t3 and t4; and FIG. 4 corresponds to the timing diagram between times t5 and t6.

Figure 2:
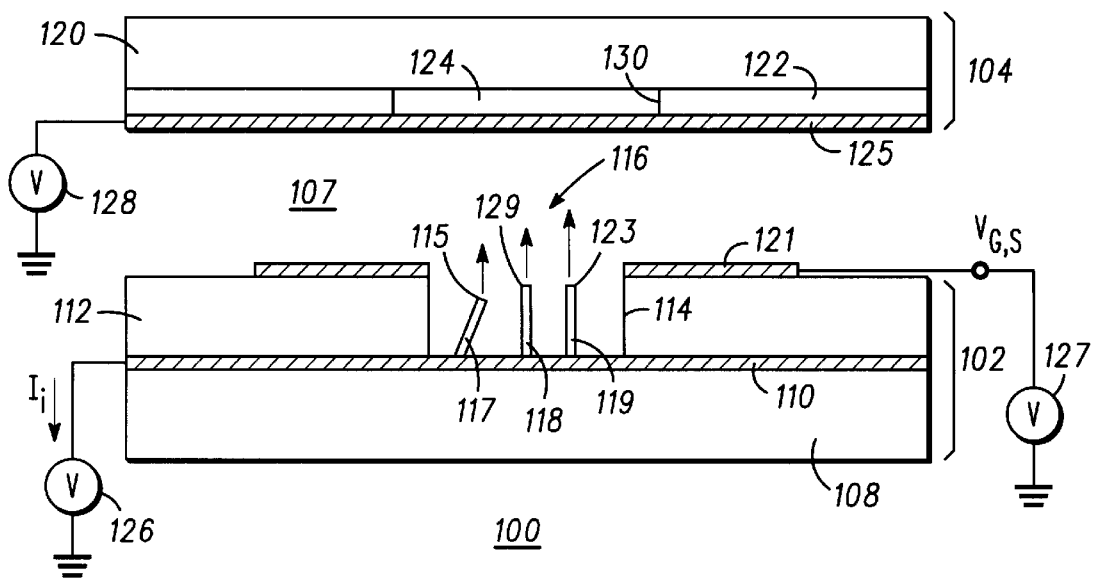
FIG. 2 is a cross-sectional view of a field emission display having an electron emitter made from carbon nanotubes.
Figure 3:
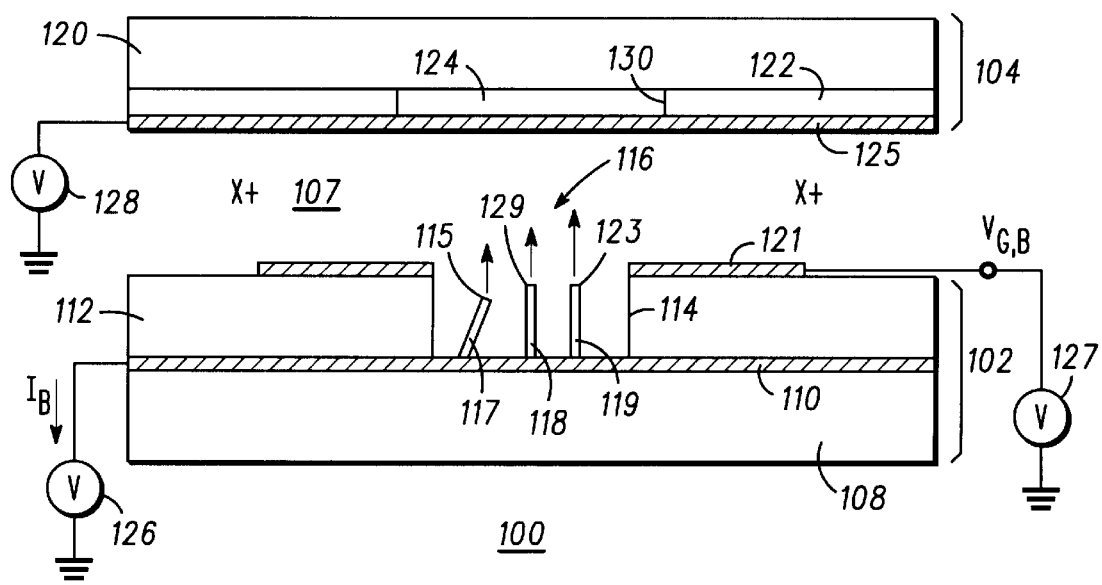
FIG. 3 is a cross-sectional view of the field emission display of FIG. 2, and further illustrates the performance thereon of various steps in accordance with the preferred example of FIG. 1.

FIG. 2 is a cross-sectional view of a field emission display (FED) 100 having an electron emitter 116 made from carbon nanotubes. Although FIG. 2 illustrates a display device, the scope of the invention is not limited to display devices. Rather, the method of the invention can be useful for improving emission uniformity in any type of field emission device. Furthermore, the electrode configuration of the field emission device, upon which the steps of the method of the invention can be performed, is not limited to a triode configuration, such as illustrated in FIG. 2. For example, the method of the invention is useful for improving emission uniformity of a field emission device having a diode configuration or a triode configuration other than the one described herein.

FED 100 includes a cathode plate 102 and an anode plate 104. Cathode plate 102 is spaced apart from anode plate 104 to define an interspace region 107 therebetween. Cathode plate 102 includes a substrate 108, which can be made from glass, silicon, ceramic, and the like. A cathode 110 is disposed upon substrate 108. Cathode 110 is connected to a first voltage source 126. A dielectric layer 112 is disposed upon cathode 110 and defines an emitter well 114.

Electron emitter 116 is disposed within emitter well 114. The method of the invention includes the step of providing a plurality of carbon nanotubes, which define electron emitter 116. In the embodiment of FIG. 2, electron emitter 116 is disposed on the planar, bottom surface of emitter well 114. However, the scope of the invention is not limited to use with planar structures. For example, the carbon nanotubes can be disposed on a non-planar surface.

For ease of understanding, FIG. 2 only depicts three carbon nanotubes, the widths of which have been greatly exaggerated. However, any number of carbon nanotubes can be employed for defining electron emitter 116. Preferably, the surface density of carbon nanotubes is high. For example, the surface density can be equal to about $10^8$ carbon nanotubes per $cm^2$.

In general, each carbon nanotube is oriented to dispose an emissive end within the emitter well. Thus, as illustrated in FIG. 2, a first carbon nanotube 119, a second carbon nanotube 118, and a third carbon nanotube 117 define ends 123, 129, and 115, respectively, which are disposed within emitter well 114. Carbon nanotubes 119, 118, and 117 are connected to cathode 110.

Methods for making carbon nanotubes are known to one skilled in the art. The carbon nanotubes can be deposited by using one of several convenient deposition methods. For example, the carbon nanotubes can be mixed with a binder and thereafter screen-printed. Alternatively, they can be electrophoretically deposited into emitter well 114. Cathode plate 102 further includes a gate extraction electrode 121, which is disposed on dielectric layer 112 and is connected to a second voltage source 127.

Anode plate 104 includes a transparent substrate 120 made from a solid, transparent material, such as a glass. A black matrix 122 is disposed on transparent substrate 120 and is preferably made from chrome oxide. A phosphor 124 is disposed within an opening 130 defined by black matrix 122. Phosphor 124 is cathodoluminescent and emits light upon activation by electrons, which are emitted by electron emitters 116.

An anode 125, which is preferably made from aluminum, defines a blanket layer overlying phosphor 124 and black matrix 122. Anode 125 is connected to a third voltage source 128. Methods for fabricating cathode plates and anode plates for matrix-addressable FEDs are known to one of ordinary skill in the art.

FED 100 is operated by applying to cathode 110 and gate extraction electrode 121 potentials selected to cause electron emitter 116 to emit electrons. For example, typical scanning mode voltages include ground potential at cathode 110 and about 100 volts at gate extraction electrode 121. The scanning mode is the mode of operation of FED 100 during which phosphor 124 is activated. The voltage at anode 125 is selected to attract the field-emitted electrons and to provide a desired brightness level of the display image.

Arrows in FIG. 2 represent the initial emission current capabilities of carbon nanotubes 119, 118, and 117. In general, the emission current capability of a nanotube is defined as the emission current, which could be emitted by that nanotube if the electron emitter were subjected to an emission-causing voltage configuration. The emission-causing voltage configuration, for the purpose of defining the emission current capabilities, does not cause removal of carbon from the nanotubes.

In general, the method of the invention selectively reduces the emission current capabilities of at least the highest emission nanotubes. The method of the invention includes the step of providing a first carbon nanotube and a second carbon nanotube, wherein the first carbon nanotube is characterized by a first emission current capability and the second carbon nanotube is characterized by a second emission current capability, which is less than the first emission current capability of the first carbon nanotube. The method of the invention further includes the concurrent steps of causing the first carbon nanotube to be reduced in length at a first rate and causing the second carbon nanotube to be reduced in length at a second rate, which is less than the first rate at which the first carbon nanotube is reduced in length. In general, a reduction in the length of a nanotube results in a reduction of that nanotube's emission current capability. Thus, the concurrent steps can be used to cause a reduction in the difference between the second emission current capability and the first emission current capability and can thereby improve uniformity of emission.

It is desired to be understood that the second rate at which the length of the second carbon nanotube is reduced can be equal to zero, so that only the emission current capability of the first carbon nanotube is reduced, and the emission current capability of the second carbon nanotube remains constant. In this manner, the difference between the emission current capabilities can be reduced.

A similar improvement in uniformity can be achieved by causing the emission current capability of the first carbon nanotube to be reduced at a greater rate than that at which the emission current capability of the second carbon nanotube is reduced. This may be achieved by causing the length of the first carbon nanotube to be reduced at a greater rate than that at which the length of the second carbon nanotube is reduced.

Figure 4:
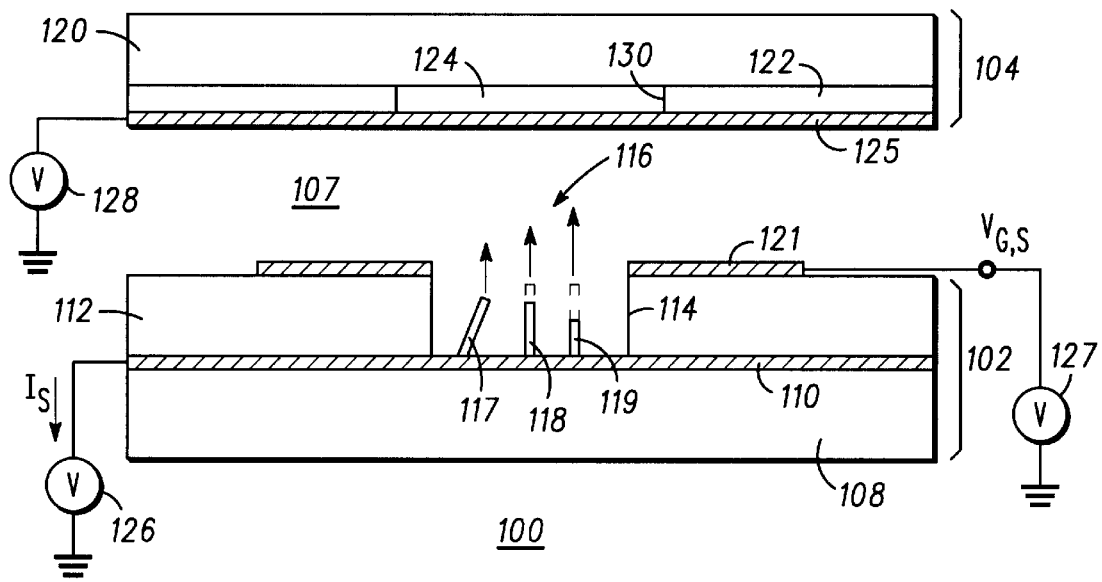
FIG. 4 is a cross-sectional view of the field emission display of FIG. 2, and further indicates the emission current capabilities of the carbon nanotubes subsequent to the performance thereon of steps in accordance with the method of the invention for improving the uniformity of emission current of a field emission device.

Both of these approaches to improving uniformity are depicted in the progression from FIG. 2 to FIG. 4. The emission current capabilities of first and second carbon nanotubes 119, 118 are reduced, while the emission current capability of third carbon nanotube 117 remains constant. The reduction is performed to an extent sufficient to reduce the differences between emission current capabilities, while preferably maximizing overall current. Simultaneously, the length of first carbon nanotube 119 is reduced at a rate, which is greater than the rate at which the length of second carbon nanotube 118 is reduced. In the particular example of FIGS. 1–4, this selective length reduction results in a reduction of the difference between the emission current capabilities of first and second carbon nanotubes 119, 118.

The scope of the invention includes any scheme suitable for achieving the selective reductions in length, as described herein. The example of FIG. 1 employs a burn-in current, $I_B$, to realize the selective reductions in length. In general, an electron emitter is characterized by a maximum emission current capability. The maximum emission current capability is the maximum value of the emission current capability among the carbon nanotubes that define that particular electron emitter. The burn-in current is sufficient to cause removal of carbon from the ends of at least the carbon nanotubes that are characterized by the maximum emission current capability.

FIG. 1 includes a graph 150 of total emission current, I, which is emitted by electron emitter 116; a graph 160 of partial pressure, pX+, of a reactive species, X+; a graph 170 of temperature, T, of the environment in which electron emitter 116 is disposed; and a graph 180 of the gate voltage, VG, at gate extraction electrode 121.

Between times t1 and t2, graph 150 illustrates the initial total emission current, Ii, of electron emitter 116 for a scanning mode configuration of voltages. That is, the potential at cathode 110 is equal to its scanning mode value, which can be ground potential, and the potential at gate extraction electrode 121 is equal to its scanning mode value, VG, S, which can be about 100 volts. This portion of the timing diagram is included to illustrate the initial cumulative emission current capability of carbon nanotubes 119, 118, and 117, and to illustrate the reduction in total emission current, which occurs due to the method of the invention. It is desired to be understood that the method of the invention does not require a distinct step for causing electron emitter 116 to emit prior to the step of selectively reducing the lengths of the nanotubes. FIG. 2 corresponds to the portion of the timing diagram of FIG. 1, which is between times t1 and t2.

Between times t3 and t4, graph 150 illustrates a preferred example of the method of the invention. In the example of FIG. 1, the steps of causing a first carbon nanotube to be reduced in length at a first rate and causing a second carbon nanotube to be reduced in length at a second rate comprise the step of causing a burn-in current to be emitted by electron emitter 116. This step is further represented by FIG. 3.

In accordance with the invention, the burn-in current, IB, is sufficient to cause removal of carbon from end 123 of at least first carbon nanotube 119. In the example of FIGS. 1 and 3, the burn-in current causes carbon removal from first carbon nanotube 119 and second carbon nanotube 118, but not from third carbon nanotube 117. Preferably, carbon removal is achieved by causing greater than about one microampere to be emitted by each nanotube that is to be selectively burned.

The burn-in current is achieved by gradually increasing the total emission current until carbon evolution and increased current uniformity are realized. An excessive rate of increase or an excessive final value of the total emission current during the burn-in step would otherwise result in arcing or excessive reduction in the cumulative emission current capability, and must, therefore, be avoided.

The increase in total emission current is realized by increasing the gate voltage from an initial value, VG,0, which can be equal to ground potential, to a burn-in value, VG,B. The burn-in current is controlled to prevent arcing, which can otherwise cause irreparable damage to FED 100. Carbon evolution is allowed to occur for a short time, and the emission uniformity is thereafter measured.

If the burn-in step is performed on cathode plate 102, in the absence of anode plate 104, emission uniformity can be measured by causing electron emitter 116 to activate a phosphor and then measuring the uniformity of the brightness of the light, which is emitted by the phosphor. Alternatively, the burn-in step can be performed after FED 100 has been hermetically sealed. In that case, the uniformity can be measured by causing phosphor 124 to emit light. Methods for measuring the uniformity of brightness are known to one of ordinary skill in the art.

It is believed that the removal of carbon from a nanotube is due to, at least in part, the field desorption of carbon. The field desorption is enhanced by an increase in temperature of the nanotubes. An increase in temperature of the nanotubes is caused by the high value of the burn-in current. In accordance with the method of the invention, carbon removal can be further enhanced by employing the step of placing electron emitter 116 in an environment characterized by a temperature, which is greater than room temperature. The preferred example of FIG. 1 includes this step of increasing the temperature from an initial value, T0, which can be equal to room temperature, to an elevated, burn-in temperature, TB, during the burn-in period (times t3 to t4).

Increasing the temperature can result in the additional advantage of lowering series resistances, such as resistances due to ballast resistors that may be connected in series with cathode 110. The reduced series resistances improve, among other things, the power requirement for achieving the burn-in current.

In accordance with the method of the invention, the removal of carbon can be further facilitated by performing the step of providing a species selected to facilitate the removal of carbon. For example, an ionized inert gas, such as argon, can be provided. The ionized inert gas functions as a heavy gas that removes carbon by sputtering. In another example, the step of providing a species selected to facilitate the removal of carbon includes the step of providing a reactive species selected to facilitate the removal of carbon. The reactive species is preferably an oxygen-containing species, such as $O_2$, $CO$, $CO_2$, $O_3$, $NO$, $NO_2$, $H_2O$, $N_2O$, and the like.

The preferred example of FIGS. 1 and 3 further includes the step of providing reactive species, X+, which is selected to facilitate the removal of carbon. The partial pressure, pX+, of the reactive species is increased during the burn-in period to a burn-in value, pX+,B, as indicated by graph 160. Preferably, the reactive species is an oxygen-containing species. The oxygen-containing species is ionized by electrons emitted from electron emitter 116. The ionized oxygen-containing species is attracted to and reacts with carbon at ends 123 and 129 of first and second carbon nanotubes 119 and 118, respectively, thereby facilitating carbon removal.

In another example of the method of the invention, electron emitter 116 is disposed in a vacuum environment during the step of causing a burn-in current to be emitted by electron emitter 116. Preferably, the vacuum environment is characterized by a pressure equal to less than about 10–5 Pascal. For example, the step of causing a burn-in current to be emitted can be performed subsequent to the evacuation and hermitic sealing of FED 100.

FIG. 4 is a cross-sectional view of FED 100 of FIG. 2, and further indicates the emission current capabilities of carbon nanotubes 119, 118, and 117 subsequent to the performance thereon of steps in accordance with the method of the invention for improving the uniformity of emission current of a field emission device. FIG. 4 also corresponds to the portion of the timing diagram of FIG. 1, which is between times t5 and t6. Dashed lines in FIG. 4 represent the portions of first and second carbon nanotubes 119 and 118, which are removed during the burn-in period. Arrows in FIG. 4 represent the emission current capabilities of carbon nanotubes 119, 118, and 117. A comparison of FIG. 4 with FIG. 2 reveals that the emission current capabilities are more uniform due to the selective carbon removal step. Graph 150 of FIG. 1 further illustrates (times t5 to t6) that the total emission current, I, for a scanning mode configuration of voltages drops to a scanning mode value, IS, due to the selective carbon removal step.

In accordance with another embodiment of the invention, the steps of causing a first carbon nanotube to be reduced in length at a first rate and causing a second carbon nanotube to be reduced in length at a second rate include the steps of providing a positive potential and a first electric field strength at the end of the first carbon nanotube, wherein the first electric field strength is sufficient to cause removal of carbon from the end of the first carbon nanotube, and providing a positive potential and a second electric field strength at the end of the second carbon nanotube, wherein the first electric field strength is greater than the second electric field strength. In this embodiment, carbon removal is achieved by the reverse polarization of the carbon nanotubes. No additional reactive species is required.

Figure 5:
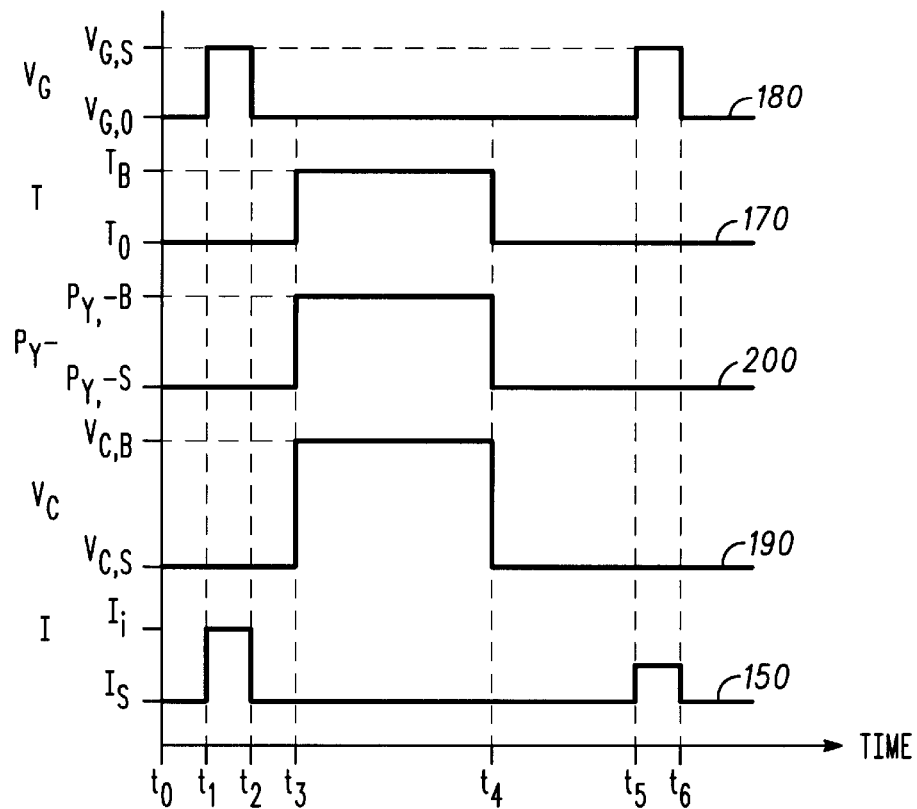
FIG. 5 is a timing diagram of another example, which utilizes reverse polarization of the carbon nanotubes and a negatively charged reactive species, of a method for improving the uniformity of emission current of a field emission device, in accordance with the invention.

FIG. 5 is a timing diagram of another example of a method for improving the uniformity of emission current of FED 100, in accordance with the invention. The example of FIGS. 5 and 6 utilizes reverse polarization of carbon nanotubes 119, 118, and 117 and further utilizes a negatively charged reactive species, Y-. The example of FIG. 5 does not use a burn-in current.

The timing diagram of FIG. 5 further includes a graph 190 of the cathode voltage, VC, at cathode 110 and a graph 200 of the partial pressure, pY-, of the negatively charged reactive species, Y-. The burn-in period (times t3 to t4) for the example of FIG. 5 is described with reference to FIG. 6.

Figure 6:
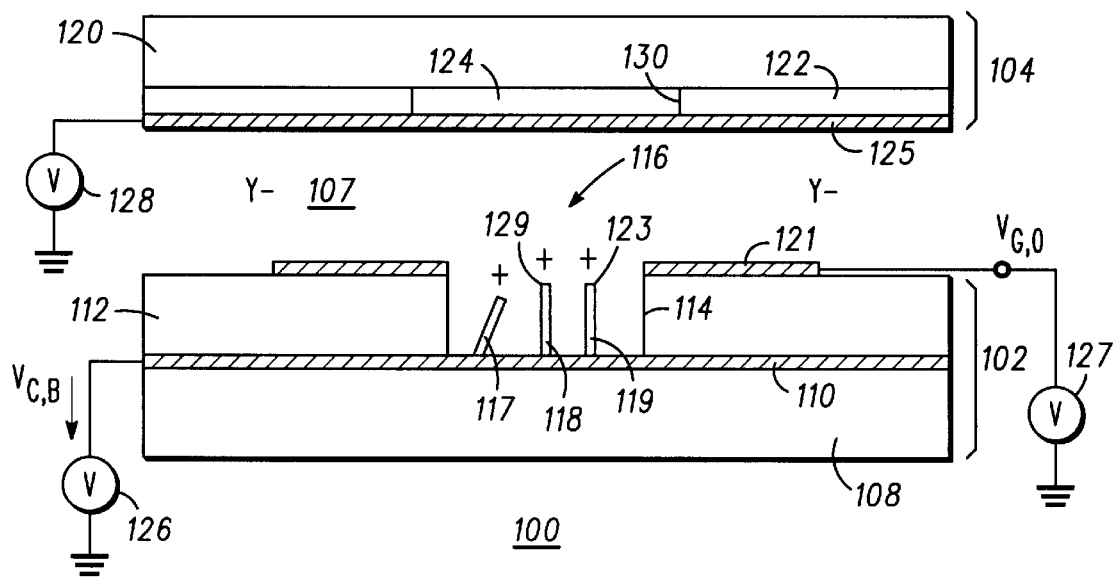
FIG. 6 is a cross-sectional view of the field emission display of FIG. 2, and further illustrates the performance thereon of various steps in accordance with the example of FIG. 5.

FIG. 6 is a cross-sectional view of FED 100 of FIG. 2 and further illustrates the performance thereon of various steps in accordance with the example of FIG. 5. In the example of FIGS. 5 and 6, the polarity of gate extraction electrode 121 and electron emitter 116 is the reverse of the polarity used in the example of FIG. 1. As illustrated in FIG. 5 by graphs 180 and 190, the gate voltage, VG,0, during the burn-in period (times t3 to t4) can be equal to ground potential, and the cathode voltage can be increased from its scanning mode value, VC,S, which can be equal to ground potential, to a burn-in value, VC,B. The burn-in value of the cathode voltage is selected to attract to electron emitter 116 the negatively charged reactive species and to facilitate reaction therebetween.

The partial pressure, pY-, of the negatively charged reactive species is increased during the burn-in period from an initial value, pY-,S, which can be zero, to a burn-in value, pY-,B, as indicated by graph 160. The negatively charged reactive species reacts with the nanotube to produce a gaseous carbon-containing product, thereby causing the removal of carbon from the nanotube. Preferably, the negatively charged reactive species is an ionized oxygen-containing species, such as ionized hydrogen peroxide, ionized oxygen, and the like.

In general, the rate of reaction is greatest at the ends of the nanotubes, which have the highest electric field strengths. These are also generally the nanotubes that have the highest emission current capabilities. Thus, the example of FIGS. 5 and 6 causes the selective reduction in length of the highest emission nanotubes, in accordance with the invention, thereby improving emission current uniformity.

It is desired to be understood that the steps described herein for improving the uniformity of emission current among individual nanotubes are also useful for improving the uniformity of emission current among individual electron emitters 116.

In summary, the invention is for a method for improving uniformity of emission current of a field emission device. The method of the invention includes the steps of providing carbon nanotubes and controllably and selectively reducing the lengths of the carbon nanotubes, in a manner that results in greater uniformity of emission. The selective reduction in lengths of the carbon nanotubes can be achieved by, for example, employing a burn-in current or employing electric field-dependent chemistry while the polarity of the carbon nanotubes is reversed. The method of the invention can be performed easily and quickly at low cost, is largely self-controlling, and prevents harm to device electronics due to electrical arcing.

While we have shown and described specific examples of the present invention, further modifications and improvements will occur to those skilled in the art. For example, the method of the invention can be performed while placing the electron emitter in an environment characterized by a temperature, which is equal to room temperature. We desire it to be understood, therefore, that this invention is not limited to the particular forms shown, and we intend in the appended claims to cover all modifications that do not depart from the spirit and scope of this invention.

We claim:

1. A method for improving uniformity of emission current of a field emission device (100) comprising the steps of:

providing a first carbon nanotube (119) and a second carbon nanotube (118), wherein the first carbon nanotube (119) is characterized by a first emission current capability and the second carbon nanotube (118) is characterized by a second emission current capability, and wherein the first emission current capability is greater than the second emission current capability;

hermetically sealing the field emission device (100);

causing the first carbon nanotube (119) to be reduced in length at a first rate subsequent to the step of hermitically sealing the field emission device (100); and concurrent with the step of causing the first carbon nanotube (119) to be reduced in length at a first rate, causing the second carbon nanotube (118) to be reduced in length at a second rate, wherein the first rate is greater than the second rate, thereby reducing the difference between the second emission current capability and the first emission current capability;

wherein the first carbon nanotube (119) defines an end (123), wherein the first and second carbon nanotubes (119, 118) define an electron emitter (116), wherein the steps of causing the first carbon nanotube (119) to be reduced in length at a first rate and causing the second carbon nanotube (118) to be reduced in length at a second rate comprise the step of causing a burn-in electron current to be emitted by the electron emitter (116), and wherein the burn-in electron current is sufficient to cause removal of carbon from the end (123) of at least the first carbon nanotube (119).

2. The method for improving uniformity of emission current of a field emission device (100) as claimed in claim 1, wherein the second rate is equal to zero.

3. The method for improving uniformity of emission current of a field emission device (100) as claimed in claim 2, further comprising the step of disposing the electron emitter (116) in a vacuum environment.

4. The method for improving uniformity of emission current of a field emission device (100) as claimed in claim 3, wherein the vacuum environment is characterized by a pressure equal to less than about 10–5 Pascal.

5. The method for improving uniformity of emission current of a field emission device (100) as claimed in claim 2, further comprising the step of providing a species selected to facilitate the removal of carbon.

6. The method for improving uniformity of emission current of a field emission device (100) as claimed in claim 5, wherein the step of providing a species selected to facilitate the removal of carbon comprises the step of providing an ionized inert gas.

7. The method for improving uniformity of emission current of a field emission device (100) as claimed in claim 5, wherein the step of providing a species comprises the step of providing a reactive species selected to facilitate the removal of carbon.

8. The method for improving uniformity of emission current of a field emission device (100) as claimed in claim 7, wherein the reactive species comprises an oxygen-containing species.

9. The method for improving uniformity of emission current of a field emission device (100) as claimed in claim 2, wherein the step of providing a first carbon nanotube (119) and a second carbon nanotube (118) comprises the step of providing a first carbon nanotube (119) and a second carbon nanotube (118) in an environment characterized by a temperature, and wherein the temperature of the environment is greater than room temperature.

10. The method for improving uniformity of emission current of a field emission device (100) as claimed in claim 2, wherein the step of causing a burn-in electron current to be emitted by the electron emitter (116) comprises the step of causing greater than about one microampere to be emitted by the first carbon nanotube (119), thereby causing removal of carbon therefrom.

11. A method for improving uniformity of emission current of a field emission device (100) comprising the steps of:

providing a plurality of carbon nanotubes (117, 118, 119), wherein the plurality of carbon nanotubes (117, 118, 119) define an electron emitter (116);

hermetically sealing the field emission device (100); and causing a burn-in electron current to be emitted by the electron emitter (116) subsequent to the step of hermetically sealing the field emission device (100), wherein the burn-in current is sufficient to cause an increase in uniformity of emission current over the electron emitter (116).

12. The method for improving uniformity of emission current of a field emission device (100) as claimed in claim 11, wherein each of the plurality of carbon nanotubes (117, 118, 119) defines an end (115, 129, 123), wherein each of the plurality of carbon nanotubes (117, 118, 119) is characterized by an emission current capability, wherein the electron emitter (116) is characterized by a maximum emission current capability, and wherein the burn-in electron current is sufficient to cause removal of carbon from the ends (123) of at least those of the plurality of carbon nanotubes (119) that are characterized by the maximum emission current capability.

13. The method for improving uniformity of emission current of a field emission device (100) as claimed in claim 12, wherein the step of causing a burn-in electron current to be emitted by the electron emitter (116) comprises the step of causing greater than about one microampere to be emitted by each of the plurality of carbon nanotubes (119) that is characterized by the maximum emission current capability.

14. The method for improving uniformity of emission current of a field emission device (100) as claimed in claim 12, further comprising the step of providing a species selected to facilitate the removal of carbon.

15. The method for improving uniformity of emission current of a field emission device (100) as claimed in claim 14, wherein the step of providing a species selected to facilitate the removal of carbon comprises the step of providing an ionized inert gas.

16. The method for improving uniformity of emission current of a field emission device (100) as claimed in claim 14, wherein the step of providing a species comprises the step of providing a reactive species selected to facilitate the removal of carbon.

17. The method for improving uniformity of emission current of a field emission device (100) as claimed in claim 16, wherein the reactive species comprises an oxygen-containing species.

18. The method for improving uniformity of emission current of a field emission device (100) as claimed in claim 11, further comprising the step of disposing the electron emitter (116) in a vacuum environment.

19. The method for improving uniformity of emission current of a field emission device (100) as claimed in claim 18, wherein the vacuum environment is characterized by a pressure equal to less than about 10–5 Pascal.

20. The method for improving uniformity of emission current of a field emission device (100) as claimed in claim 11, wherein the step of providing a plurality of carbon nanotubes (117, 118, 119) comprises the step of providing a plurality of carbon nanotubes (117, 118, 119) in an environment characterized by a temperature, and wherein the temperature of the environment is greater than room temperature.

* * * * *